(12) United States Patent
Li

(10) Patent No.: US 12,415,264 B2
(45) Date of Patent: Sep. 16, 2025

(54) EXTENSIBLE STABLE CLAMPING DEVICE

(71) Applicant: Guicheng Li, Shenzhen (CN)

(72) Inventor: Guicheng Li, Shenzhen (CN)

( * ) Notice: Subject to any disclaimer, the term of this patent is extended or adjusted under 35 U.S.C. 154(b) by 795 days.

(21) Appl. No.: 17/724,530

(22) Filed: Apr. 20, 2022

(65) Prior Publication Data
US 2022/0241957 A1 Aug. 4, 2022

(51) Int. Cl.
*B25J 1/02* (2006.01)
*A47F 13/06* (2006.01)

(52) U.S. Cl.
CPC ............... *B25J 1/02* (2013.01); *A47F 13/06* (2013.01)

(58) Field of Classification Search
CPC .............. B25J 1/02; B25J 1/04; A47F 13/06
USPC .......................................... 294/107, 108, 211
See application file for complete search history.

(56) References Cited

U.S. PATENT DOCUMENTS

| | | | | |
|---|---|---|---|---|
| 7,677,619 B2 * | 3/2010 | Hutchings | .................. | B25J 1/02 56/333 |
| 8,807,615 B2 * | 8/2014 | Kovarik | .................. | A47F 13/06 294/111 |
| 9,273,821 B2 * | 3/2016 | Chang | .................. | F16M 11/041 |
| D781,120 S * | 3/2017 | James | ............... | D8/51 |
| 9,592,066 B2 * | 3/2017 | Kovarik | .................. | A61C 1/185 |
| 9,878,444 B1 * | 1/2018 | Harrington | ............. | A47F 13/06 |
| 9,931,748 B2 * | 4/2018 | Buzby | .................. | E01H 1/1206 |
| 10,500,715 B1 * | 12/2019 | Fleming | .................. | B25J 18/04 |
| D887,805 S * | 6/2020 | Fleming | ........................... | D8/51 |
| 2010/0021279 A1 * | 1/2010 | Buzby | ........................ | B25J 1/04 414/800 |
| 2010/0096866 A1 * | 4/2010 | Flinn | ..................... | E01H 1/1206 294/1.4 |
| 2010/0102583 A1 * | 4/2010 | McCoy | ..................... | B25J 1/04 294/107 |
| 2016/0214236 A1 | 7/2016 | Migliori | | |
| 2017/0129020 A1 | 5/2017 | Greif et al. | | |
| 2020/0063769 A1 | 2/2020 | King | | |
| 2022/0143807 A1 * | 5/2022 | Li | .............................. | B25J 1/04 |
| 2023/0114133 A1 * | 4/2023 | Smith | ........................ | B25J 1/04 294/210 |
| 2024/0286268 A1 * | 8/2024 | Pesek | ..................... | B25G 1/102 |

* cited by examiner

*Primary Examiner* — Paul T Chin
(74) *Attorney, Agent, or Firm* — Hemisphere Law, PLLC; Zhigang Ma

(57) ABSTRACT

A chuck subassembly of the extensible stable clamping device includes two clamping jaw bodies and two clamping jaw heads. The two clamping jaw bodies are curved towards the inner sides and are symmetrically disposed; after the two clamping jaw bodies are closed, a clamping gap is formed between the clamping jaw bodies; the clamping gap can accommodate a clamped object; each clamping jaw head is located at a top of the clamping jaw body and extends a distance in a direction where the clamping jaw body extends out to form a plate shape; and after the two clamping jaw bodies are closed, the two clamping jaw heads are attached to each other to improve the clamping stability.

7 Claims, 9 Drawing Sheets

EXTENSIBLE STABLE CLAMPING DEVICE

TECHNICAL FIELD

The present disclosure belongs to the technical field of clamping tools, and particularly relates to an extensible stable clamping device.

BACKGROUND ART

In life, various small objects often fall into places such as a gap. Since the gap is small and is generally dark, it is not easy to pick up objects. At present, there are basically no special tools to pick up objects in such situations, so it is inconvenient in such cases for objects in this case. In addition, for example, such clamping devices are often used during picking and placement of an object that is difficult to reach by a user with a limited arm length, or during cleaning.

For common telescopic clamping equipment on the market at present, a conventional chuck subassembly includes two symmetrically inwardly bent clamping jaw bodies, and a clamping jaw head arranged at a top of each clamping jaw body; and the two clamping jaw heads are in contact with each other. However, when the two inwardly bent clamping jaw bodies and the two mutually contacting clamping jaw heads clamp an object, a contact area of the two mutually contacting clamping jaw heads is small, resulting in unstable clamping; a hollowing area between the two inwardly bent clamping jaw bodies is large, so that a small, round object easily falls off when being clamped Therefore, designing an extensible stable clamping device capable of achieving stable clamping, by which, it is difficult for an object to fall off during clamping of the object, has become a problem to be urgently solved.

SUMMARY

The present disclosure mainly aims to provide an extensible stable clamping device. Buckling clamping jaw bodies of the clamping device on the market are replaced with curved clamping jaw bodies, thus solving the problem of the clamping device on the market that a clamping gap between the two clamping jaw bodies is too large after the clamping jaw bodies are closed, so that a small, round object easily falls off during clamping; clamping jaw heads of the clamping device on the market are replaced with those extending a distance in a direction where the clamping jaw bodies extend out to form a plate shape, thus solving the problem of the clamping device on the market that the clamping device has small, non-uniform clamping force and an unstable clamping structure since a contact area of the two clamping jaw heads is small after the clamping jaw bodies are closed; and thus, the use experience of a user is enhanced.

In order to solve the above technical problems, the present disclosure provides the following technical solution:

An extensible stable clamping device includes a chuck subassembly capable of being closed and opened. The chuck subassembly includes two clamping jaw bodies used for clamping an object, and a clamping jaw head arranged at a top of each clamping jaw body and capable of contacting each other to maintain the stability of the extensible stable clamping device. The two clamping jaw bodies are curved towards the inner sides and are symmetrically disposed; after the two clamping jaw bodies are closed, a clamping gap is formed between the clamping jaw bodies; the clamping gap can accommodate a clamped object; each clamping jaw head is located at the top of the clamping jaw body and extends a distance in a direction where the clamping jaw body extends out to form a plate shape; and after the two clamping jaw bodies are closed, the two clamping jaw heads are attached to each other to improve the clamping stability of the extensible stable clamping device.

As a preferable solution of the extensible stable clamping device, antiskid pads are mounted on the inner side of the chuck subassembly; antiskid bulges are arranged on inner sides of the antiskid pads;

a plurality of mounting columns are arranged on the outer side of each antiskid pad; mounting slots are arranged at positions, corresponding to the corresponding mounting columns, of the clamping jaw bodies and the clamping jaw heads; and after the mounting columns are mounted into the corresponding mounting slots, the antiskid pads are mounted on inner sides of the corresponding clamping jaw bodies and the clamping jaw heads.

As a preferable solution of the extensible stable clamping device, the extensible stable clamping device further includes a foldable connecting rod subassembly, a handle mounted at one end of the connecting rod subassembly, and a drive subassembly mounted at the other end of the connecting rod subassembly; the chuck subassembly is mounted on the drive subassembly; and the drive subassembly is driven to drive the chuck subassembly to be closed and opened, thus completing picking and placement of the object.

As a preferable solution of the extensible stable clamping device, the driving subassembly includes a drive trigger mounted on the handle, a drive connecting rod which is in drive connection with the drive trigger, an actuator mounted on the drive connecting rod, a drive body used for mounting the actuator, and driving support rods and driven support rods; one end of each driving support rod and one end of each driven support rod are rotatably mounted on the drive body, and the other end of the driving support rod and the driven support rod are rotatably connected to the chuck subassembly; the driving support rods are further in drive connection with the actuator; the drive trigger is triggered towards the handle; the drive trigger drives the drive connecting rod; the drive connecting rod drives the actuator to move towards the handle; the actuator drives the driving support rods to rotate towards the inner side; the driving support rods drive, through the chuck subassembly, the driven support rods to rotate towards the inner side, thus closing the chuck subassembly; the drive trigger is triggered away from the handle; the drive trigger drives the drive connecting rod; the drive connecting rod drives the actuator to move away from the handle; the actuator drives the driving support rods to rotate towards the outer side; and the driving support rods drive, through the chuck subassembly, the driven support rods to rotate towards the outer side, thus opening the chuck subassembly;

As a preferable solution of the extensible stable clamping device, the drive subassembly further includes a reset spring; the reset spring is sleeved on the drive connecting rod; one end of the reset spring abuts against the drive body, and the other end of the reset spring abuts against the actuator; and the reset spring is capable of being compressed by the actuator and supporting the actuator to be reset.

As a preferable solution of the extensible stable clamping device, a drive slideway is arranged at a position, corresponding to the actuator, of the drive body, and the drive slideway is used for allowing the actuator to slide.

As a preferable solution of the extensible stable clamping device, the actuator is provided with a first stop part and a second stop part; the first stop part is arranged at a position of the actuator close to the drive connecting rod; the second stop part is arranged at a position of the actuator away from the drive connecting rod; when the chuck subassembly is closed, the first stop part abuts against the drive body, thus preventing the actuator from further moving towards the drive trigger; and when the chuck subassembly is opened, the second stop part abuts against the driven support rod, thus preventing the actuator from further moving away from the drive trigger.

As a preferable solution of the extensible stable clamping device, a support rod stop part is arranged at a position, corresponding to the chuck subassembly, of each driving support rod; and after the chuck subassembly is closed, the support rod stop parts abut against the chuck subassembly, thus preventing the chuck subassembly from being loosened.

As a preferable solution of the extensible stable clamping device, the connecting rod subassembly includes at least two connecting rods; one end of one of the two connecting rods is connected to the handle, and one end of the other connecting rod is connected to the drive subassembly; the other ends of the two connecting rods are rotatably connected through a connecting subassembly, so that the two connecting rods are capable of being spread from and gathered with each other; the connecting subassembly includes two connecting heads; one ends of the two connecting heads are pivoted, and the other ends of the two connecting heads are connected through a fastener; when the fastener is locked, the two connecting rods are spread from each other to achieve locking; and when the fastener is unlocked, the two connecting rods are rotatable for gathering.

As a preferable solution of the extensible stable clamping device, the connecting rod subassembly further includes a fixing fastener; the fixing fastener includes two C-shaped fasteners, the back parts of which are connected; after the two connecting rod subassemblies retract, each connecting rod extends into the corresponding C-shaped fastener for fastening;

a fastening bulge is arranged in each C-shaped fastener; fastening slots are arranged at positions, corresponding to the fastening bulges, of the corresponding connecting rods; and the fastening bulges are capable of being fastened to the corresponding fastening slots, so as to firmly gather and fix the connecting rods.

The present disclosure has the beneficial effects:
1. Buckling clamping jaw bodies of the clamping device on the market are replaced with curved clamping jaw bodies, thus solving the problem of the clamping device on the market that a clamping gap between the two clamping jaw bodies is too large after the clamping jaw bodies are closed, so that a small, round object easily falls off during clamping; clamping jaw heads of the clamping device on the market are replaced with those extending a distance in a direction where the clamping jaw bodies extend out to form a plate shape, thus solving the problem of the clamping device on the market that the clamping device has small, non-uniform clamping force and an unstable clamping structure since a contact area of the two clamping jaw heads is small after the clamping jaw bodies are closed; and thus, the use experience of a user is enhanced.
2. The antiskid pads are mounted in the chuck subassembly; the antiskid bulges are arranged on the antiskid pads; and the antiskid pads are mounted on the inner side of the chuck subassembly by means of mutual cooperation of the mounting columns and the mounting slots. The mounting structure is simple, and the mounting is convenient and fast. When the chuck subassembly clamps the object, the antiskid pads can further clamp the object, so that it is difficult for the object to fall off, which further improves the stability of the clamping device for clamping the object.
3. In the operating process, the drive trigger that drives the handle drives the drive connecting rod to drive the actuator connected to the drive connecting rod, so that the actuator drives the driving support rods and the driven support rods in the sliding process in the drive body, and the driving support rods and the driven support rods drive the chuck subassembly to be closed and opened. The above driving support rods and the driven support rods are four I-shaped arm levers. The four I-shaped arm levers are uniformly distributed on two sides of the drive body; and one end of each I-shaped arm lever is connected to the drive body through a pin, and the other end of the I-shaped arm lever is connected to the chuck subassembly through a pin. By the above setting, the force of the entire chuck subassembly during the clamping of the object can be more uniformly dispersed. The strength is higher than that of a single support rod, thus avoiding the chuck subassembly from being broken.

BRIEF DESCRIPTION OF THE DRAWINGS

In order to explain the technical solutions of the embodiments of the present disclosure more clearly, the following will briefly introduce the accompanying drawings used in the description of the embodiments. Apparently, the drawings in the following description are only some embodiments of the present disclosure. Those of ordinary skill in the art can obtain other drawings based on these drawings without creative work, and these drawings all fall within the protection scope of the present disclosure.

DETAILED DESCRIPTION OF THE EMBODIMENTS

Figure 1:
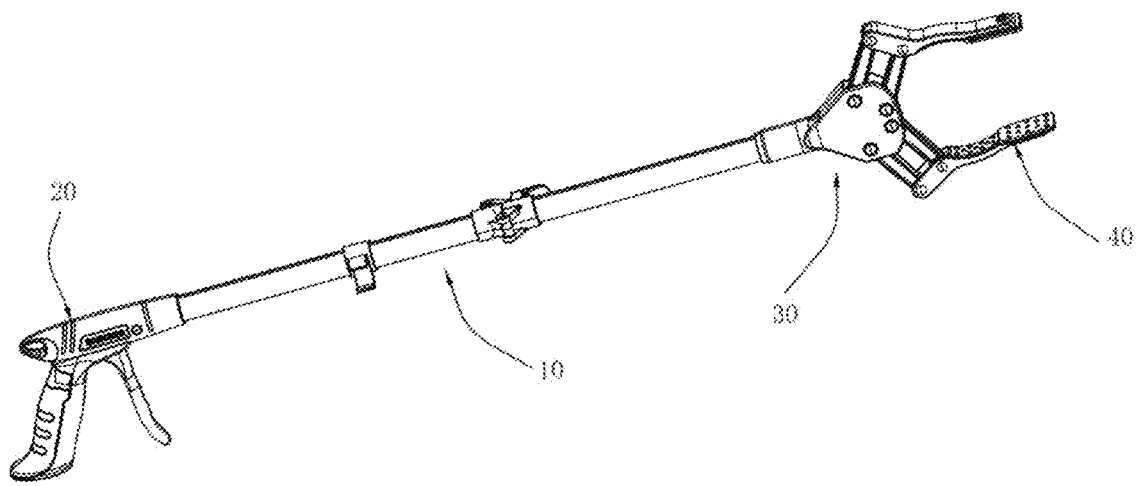
FIG. 1 is a schematic structural diagram of extending and opening of an extensible stable clamping device according to an embodiment of the present disclosure.

The technical solutions in the embodiments of the present disclosure will be clearly and completely described below. Apparently, the described embodiments are only a part of the embodiments of the present disclosure, rather than all the embodiments. Based on the embodiments in the present disclosure, all other embodiments obtained by those ordinarily skilled in the art without doing creative work shall fall within the protection scope of the present disclosure.

Therefore, the following detailed description for the embodiments of the present disclosure provided in the accompanying drawings is not intended to limit the scope of the claimed present disclosure, but merely represents selected embodiments of the present disclosure. It should be noted that, in the case of no conflict, various features in the embodiments of the present disclosure can be combined with each other, and the combined embodiments still fall within the protection scope of the present disclosure.

It should be noted that similar reference signs and letters indicate similar items in the following drawings. Therefore, once a certain item is defined in one drawing, it is unnecessary to be further defined and explained in the subsequent drawings.

In the description of the present disclosure, it should be noted that orientations or positional relationships indicated by the terms "center", "upper", "lower", "left", "right", "vertical", "horizontal", "inner" and "outer" are based on the orientations or positional relationships shown in the accompanying drawings, or the orientations or positional relationships where a product of the present disclosure is usually placed during use, which are only for the convenience of describing the present disclosure and simplifying the description, not intended to indicate or imply that the referred device or element must have a particular orientation and be constructed and operated in a particular orientation. Therefore, they should not be construed as a limitation to the present disclosure. In addition, the terms "first", "second", "third", etc. are only for the purpose of distinguishing descriptions, and may not be understood as indicating or implying the relative importance.

In addition, the terms "horizontal", "vertical", and the like do not mean that the component is required to be absolutely horizontal or overhanging, but may be slightly inclined. For example, "horizontal" only means that its direction is more horizontal than "vertical", and it does not mean that the structure must be completely horizontal, but can be slightly inclined.

In the description of the present disclosure, it should be also noted that unless otherwise explicitly defined and defined, the terms "arranged", "mounted", "coupled", and "connected" shall be understood broadly, and may be, for example, fixedly connected, or removably connected, or integrally connected, or mechanically connected, or electrically connected, or directly connected, or indirectly connected through an intermediate medium, or interconnection between two elements. Those of ordinary skill in the art can understand the specific meanings of the above terms in the present disclosure according to specific situations.

In life, various small objects often fall into places such as a gap. Since the gap is small and is generally dark, it is not easy to pick up objects. At present, there are basically no special tools to pick up objects in such situations, so it is inconvenient in such cases for objects in this case. In addition, for example, such clamping devices are often used during picking and placement of an object that is difficult to reach by a user with a limited arm length, or during cleaning.

For common telescopic clamping equipment on the market at present, a conventional chuck subassembly includes two symmetrically inwardly bent clamping jaw bodies, and a clamping jaw head arranged at a top of each clamping jaw body; and the two clamping jaw heads are in contact with each other. However, when the two inwardly bent clamping jaw bodies and the two mutually contacting clamping jaw heads clamp an object, a contact area of the two mutually contacting clamping jaw heads is small, resulting in unstable clamping; a hollowing area between the two inwardly bent clamping jaw bodies is large, so that a small, round object easily falls off when being clamped Therefore, designing an extensible stable clamping device capable of achieving stable clamping, by which, it is difficult for an object to fall off during clamping of the object, has become a problem to be urgently solved.

Figure 2:
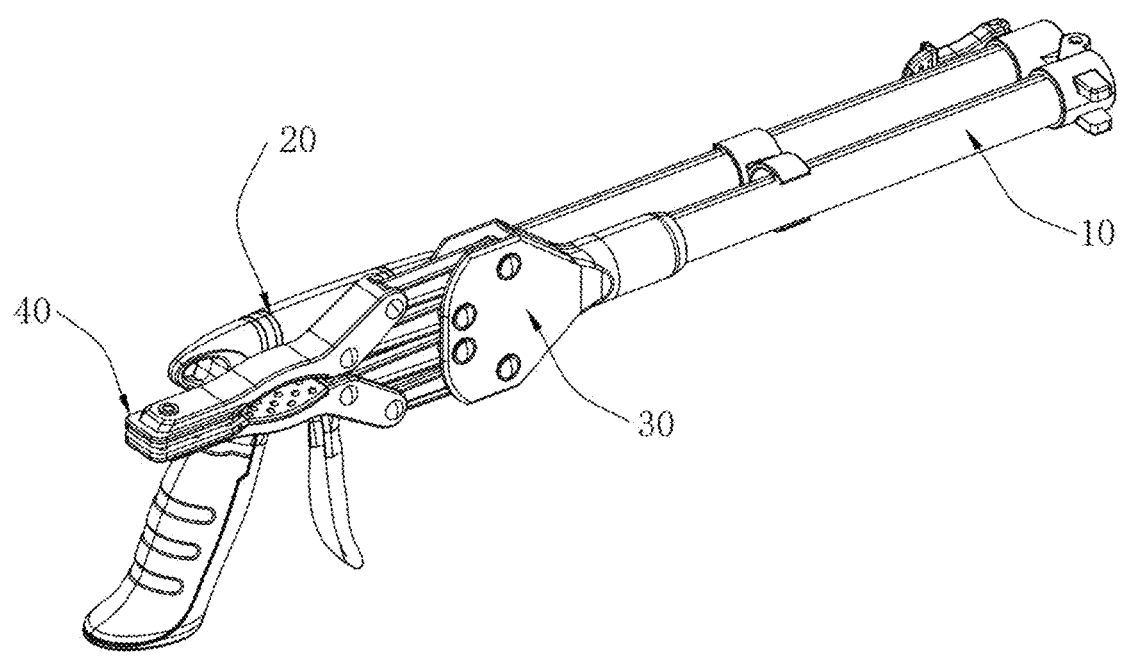
FIG. 2 is a schematic structural diagram of retracting and closing of an extensible stable clamping device according to an embodiment of the present disclosure.
Figure 3:
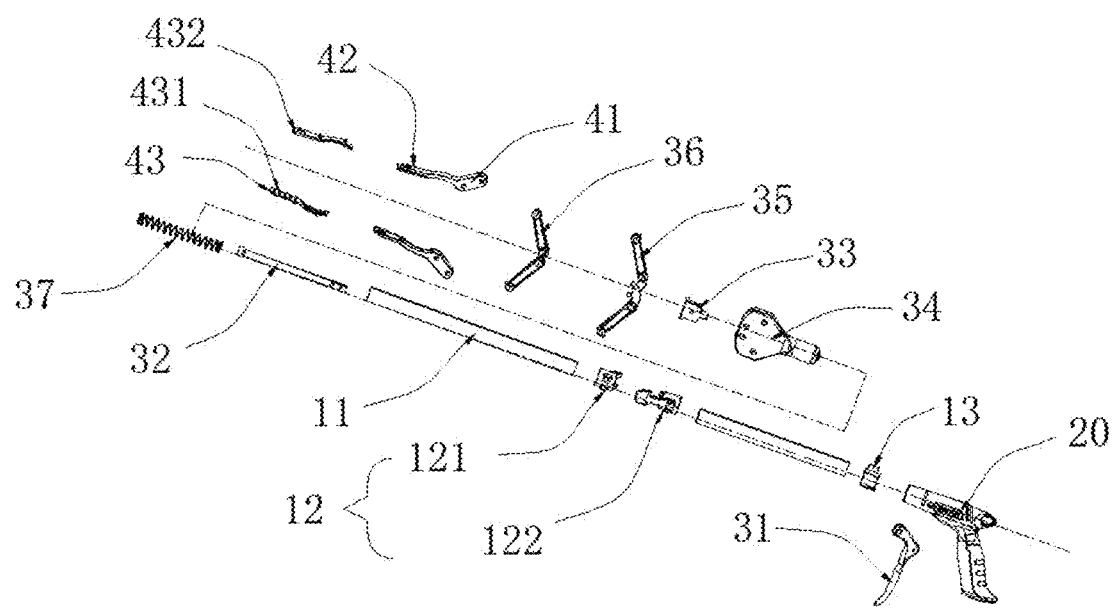
FIG. 3 is an exploded diagram of extending and opening of the extensible stable clamping device shown in FIG. 1.
Figure 4:
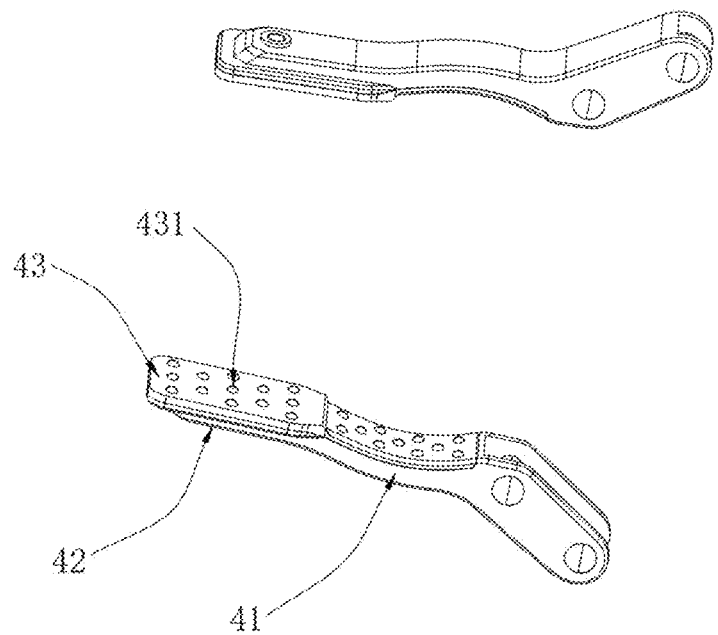
FIG. 4 is a schematic structural diagram of a chuck subassembly of the extensible stable clamping device shown in FIG. 3.
Figure 5:
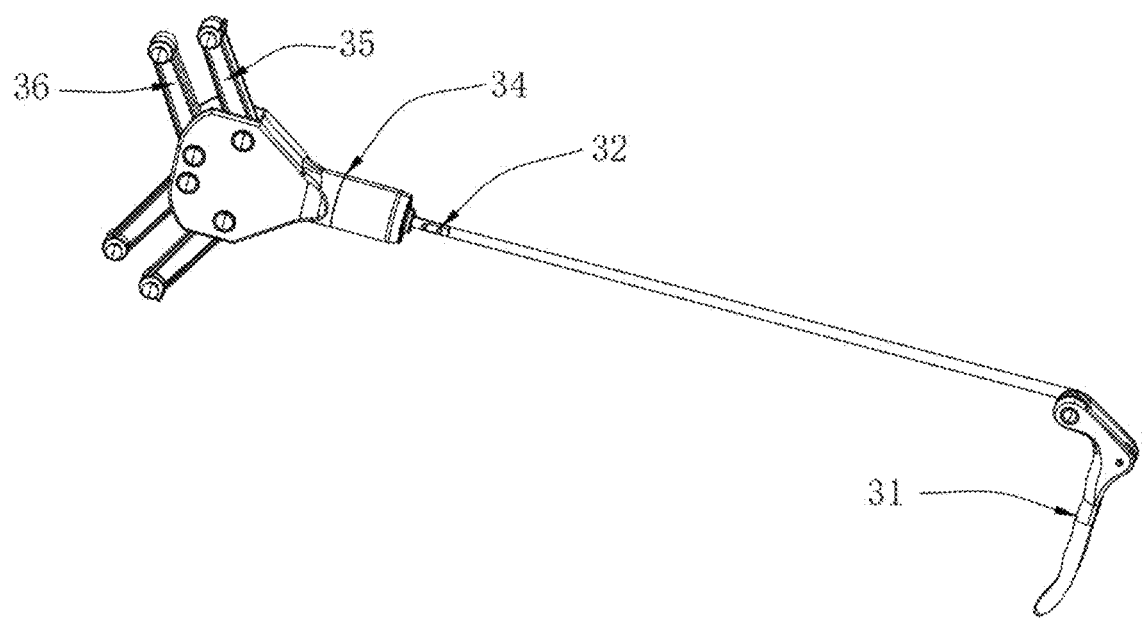
FIG. 5 is a schematic structural diagram of a drive subassembly of the extensible stable clamping device shown in FIG. 3.
Figure 6:
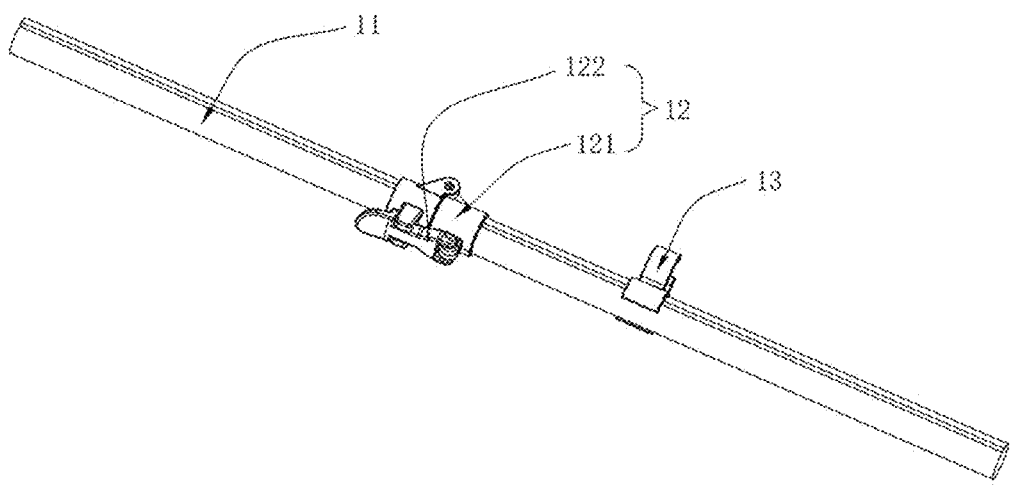
FIG. 6 is a schematic structural diagram of a connecting rod subassembly of the extensible stable clamping device shown in FIG. 3.
Figure 7:
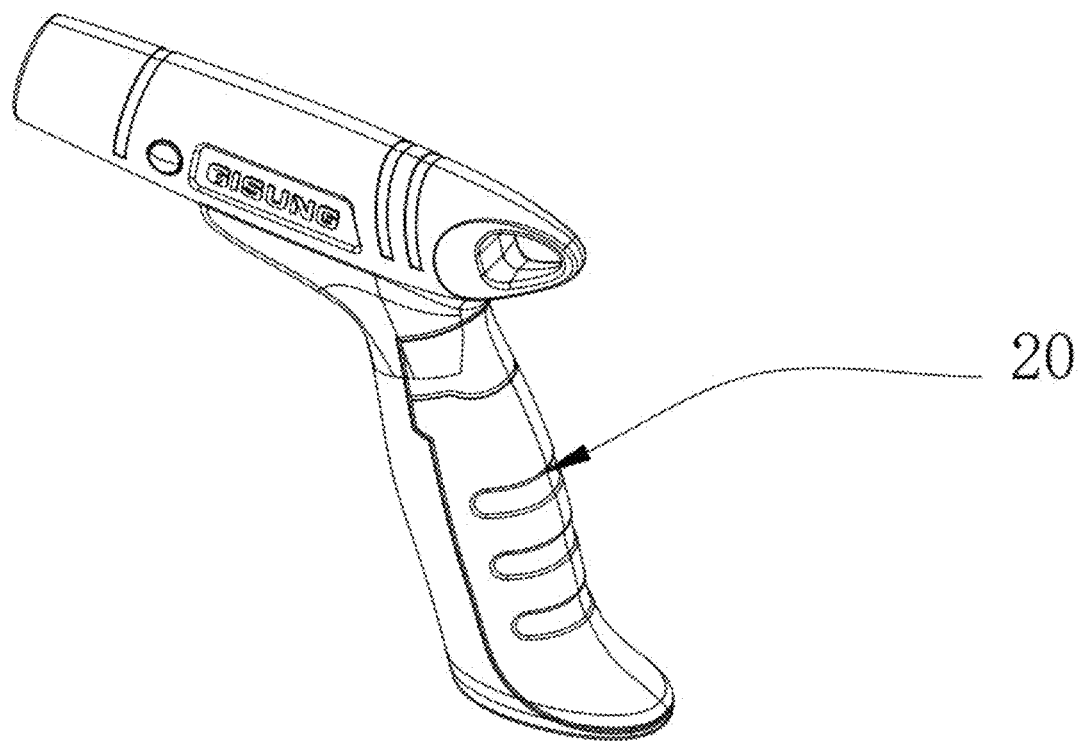
FIG. 7 is a schematic structural diagram of a handle of the extensible stable clamping device shown in FIG. 3.
Figure 8:
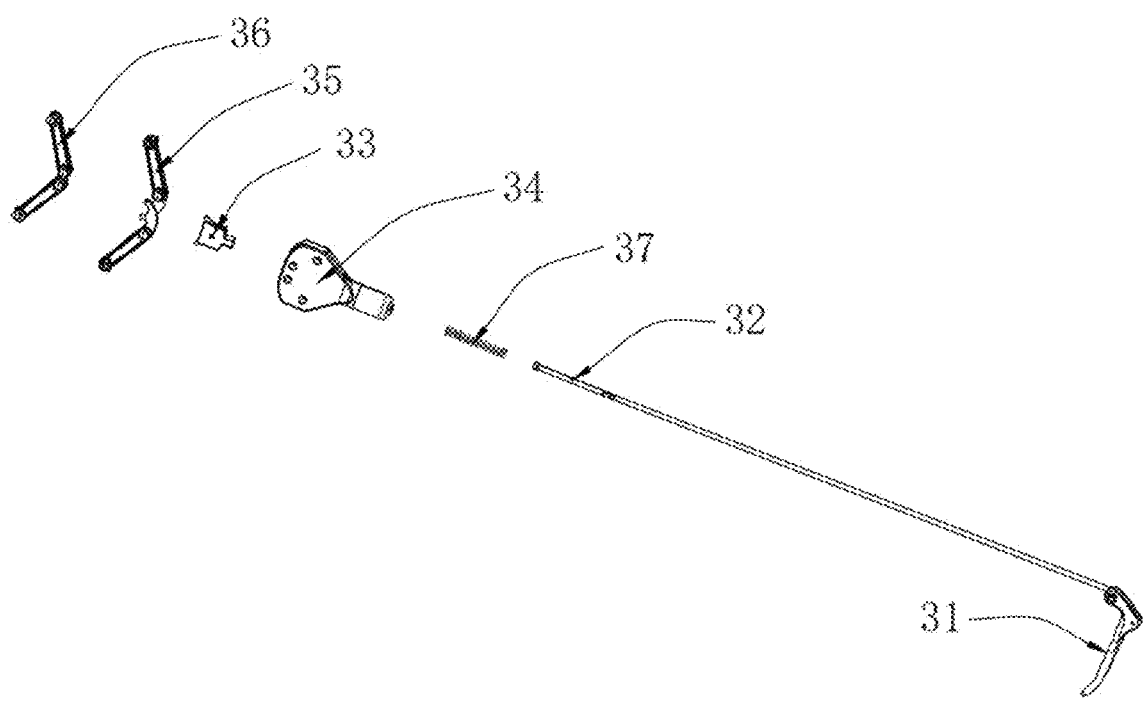
FIG. 8 is a schematic exploded diagram of the drive subassembly of the extensible stable clamping device shown in FIG. 5.
Figure 9:
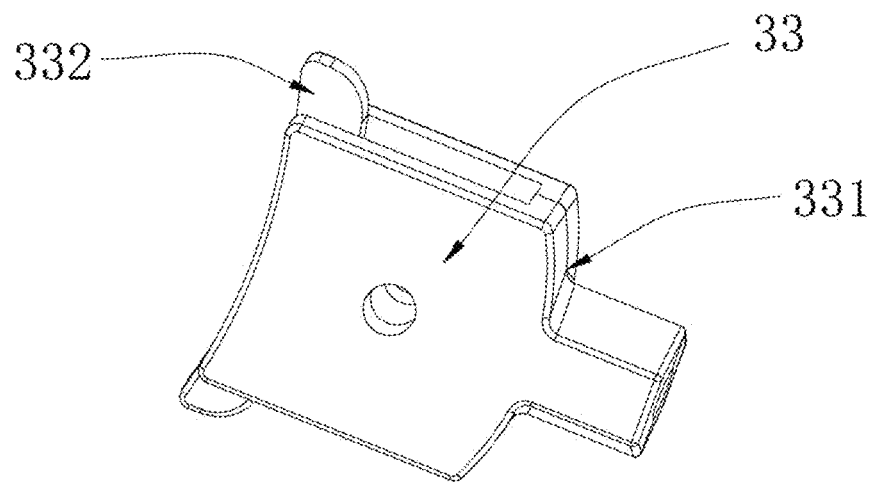
FIG. 9 is a schematic structural diagram of a drive body of the extensible stable clamping device shown in FIG. 8.
Figure 10:
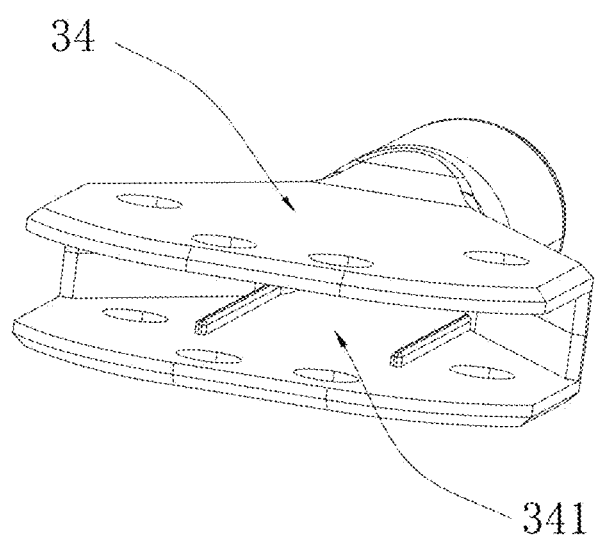
FIG. 10 is a schematic structural diagram of an actuator of the extensible stable clamping device shown in FIG. 8.
Figure 11:
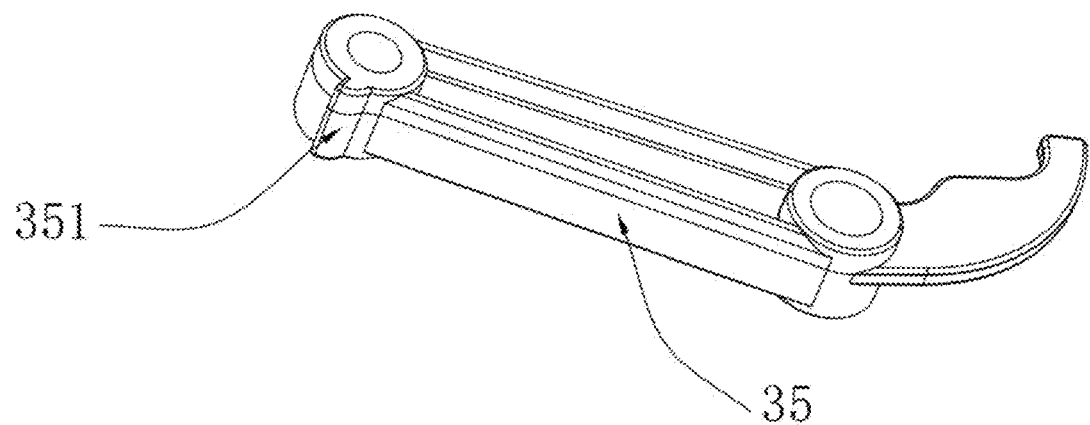
FIG. 11 is a schematic structural diagram of a driving support rod of the extensible stable clamping device shown in FIG. 8.
Figure 12:
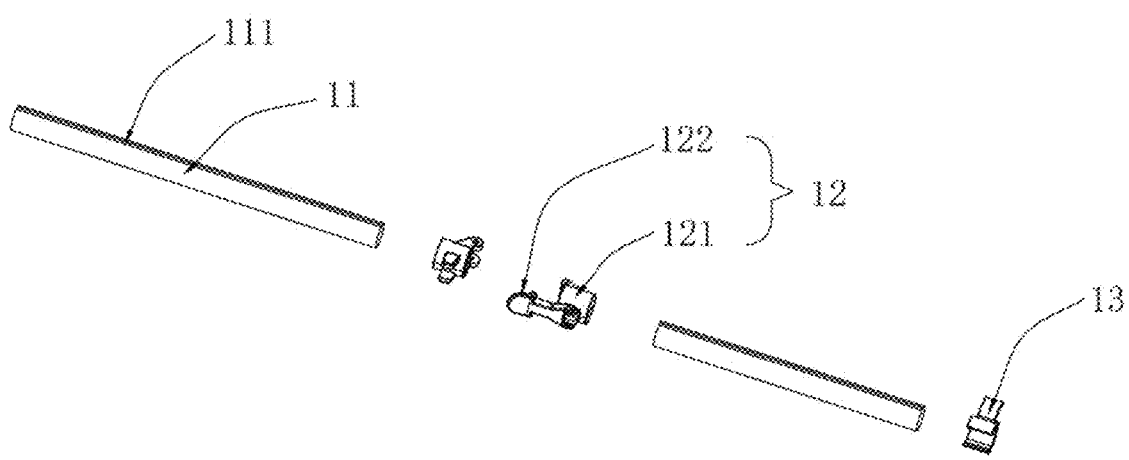
FIG. 12 is a schematic exploded diagram of a connecting rod subassembly of the extensible stable clamping device shown in FIG. 6.
Figure 13:
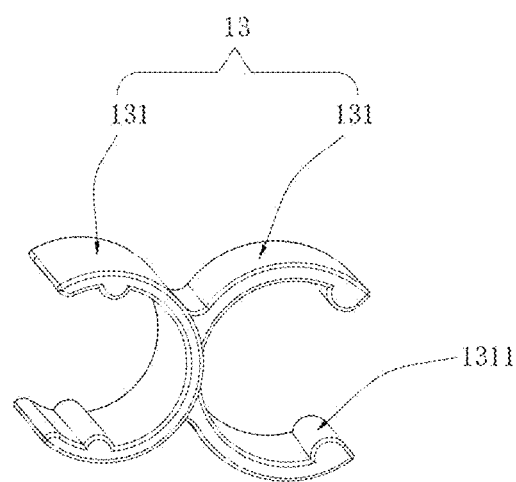
FIG. 13 is a schematic structural diagram of a fixing fastener of the extensible stable clamping device shown in FIG. 12.

Referring to FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13, an embodiment of the present disclosure provides an extensible stable clamping device, including: a foldable connecting rod subassembly 10, a handle 20 mounted at one end of the connecting rod subassembly 10, a drive subassembly 30 mounted at the other end of the connecting rod subassembly 10, and a chuck subassembly 40 which is mounted on the drive subassembly 30 and can be closed and opened. An actuator is driven to drive the chuck subassembly 40 to be closed and opened, thus completing picking and placement of an object.

Specifically, the chuck subassembly 40 includes two clamping jaw bodies 41 used for clamping the object, and a clamping jaw head 42 arranged at a top of each clamping jaw body 41 and capable of contacting each other to maintain the stability of the extensible stable clamping device. For common telescopic clamping equipment on the market at present, the conventional chuck subassembly 40 includes two symmetrically inwardly bent clamping jaw bodies 41, and a clamping jaw head 42 arranged at a top of each clamping jaw body 41; and the two clamping jaw heads 42 are in contact with each other. However, when the two inwardly bent clamping jaw bodies 41 and the two mutually contacting clamping jaw heads 42 clamp the object, a contact area of the two mutually contacting clamping jaw heads 42 is small, resulting in unstable clamping; a hollowing area between the two inwardly bent clamping jaw bodies 41 is large, so that a small, round object easily falls off when being clamped Therefore, designing an extensible stable clamping device capable of achieving stable clamping, by which, it is difficult for an object to fall off during clamping of the object, has become a problem to be urgently solved.

In the present disclosure, the two clamping jaw bodies 41 are curved towards the inner sides and are symmetrically disposed; after the two clamping jaw bodies 41 are closed, a clamping gap is formed between the clamping jaw bodies 41; and the clamping gap can accommodate the clamped object.

Each clamping jaw head 42 is located at the top of the clamping jaw body 41 and extends a distance in a direction where the clamping jaw body 41 extends out to form a plate shape; and after the two clamping jaw bodies 41 are closed, the two clamping jaw heads 42 are attached to each other to improve the clamping stability of the extensible stable clamping device.

By the adoption of the above solution, buckling clamping jaw bodies 41 of the clamping device on the market are replaced with the curved clamping jaw bodies 41, thus solving the problem of the clamping device on the market that the clamping gap between the two clamping jaw bodies 41 is too large after the clamping jaw bodies 41 are closed, so that a small, round object easily falls off during clamping; clamping jaw heads 42 of the clamping device on the market are replaced with those extending a distance in a direction where the clamping jaw bodies 41 extend out to form a plate shape, thus solving the problem of the clamping device on the market that the clamping device has small, non-uniform clamping force and an unstable clamping structure since a contact area of the two clamping jaw heads 42 is small after the clamping jaw bodies 41 are closed; and thus, the use experience of a user is enhanced.

In order to make the extensible stable clamping device more stable during the clamping of the object, antiskid pads 43 are mounted on the inner side of the chuck subassembly 40; antiskid bulges 431 are arranged on inner sides of the antiskid pads 43; a plurality of mounting columns are arranged on the outer side of each antiskid pad 43; mounting slots are arranged at positions, corresponding to the corresponding mounting columns 432, of the clamping jaw bodies 41 and the clamping jaw heads 42; and after the mounting columns are mounted into the corresponding mounting slots, the antiskid pads 43 are mounted on inner sides of the corresponding clamping jaw bodies 41 and the clamping jaw heads 42.

In the present disclosure, the antiskid pads 43 are mounted in the chuck subassembly 40; the antiskid bulges 431 are arranged on the antiskid pads 43; and the antiskid pads 43 are mounted on the inner side of the chuck subassembly 40 by means of mutual cooperation of the mounting columns and the mounting slots. The mounting structure is simple, and the mounting is convenient and fast. When the chuck subassembly 40 clamps the object, the antiskid pads 43 can further clamp the object, so that it is difficult for the object to fall off, which further improves the stability of the clamping device for clamping the object.

Specifically, the driving subassembly 30 includes a drive trigger 31 mounted on the handle 20, a drive connecting rod 32 which is in drive connection with the drive trigger 31, an actuator 33 mounted on the drive connecting rod 32, a drive body 34 used for mounting the actuator 33, and driving support rods 35 and driven support rods 36; one end of each driving support rod 35 and one end of each driven support rod 36 are rotatably mounted on the drive body 34, and the other end of the driving support rod 35 and the driven support rod 36 are rotatably connected to the chuck subassembly 40; and the driving support rods 35 are further in drive connection with the actuator 33.

The drive trigger 31 is triggered towards the handle 20; the drive trigger 31 drives the drive connecting rod 32; the drive connecting rod 32 drives the actuator 33 to move towards the handle 20; the actuator 33 drives the driving support rods 35 to rotate towards the inner side; the driving support rods 35 drive, through the chuck subassembly 40, the driven support rods 36 to rotate towards the inner side, thus closing the chuck subassembly 40.

The drive trigger 31 is driven away from the handle 20; the drive trigger 31 drives the drive connecting rod 32; the drive connecting rod 32 drives the actuator 33 to move away from the handle 20; the actuator 33 drives the driving support rods 35 to rotate towards the outer side; the driving support rods 35 drive, through the chuck subassembly 40, the driven support rods 36 to rotate towards the outer side, thus opening the chuck subassembly 40.

According to the present disclosure, in the operating process, the drive trigger 31 that drives the handle 20 drives the drive connecting rod 32 to drive the actuator 33 connected to the drive connecting rod 32, so that the actuator 33 drives the driving support rods 35 and the driven support rods 36 in the sliding process in the drive body 34, and the driving support rods 35 and the driven support rods 36 drive the chuck subassembly 40 to be closed and opened. The above driving support rods 35 and the driven support rods 36 are four I-shaped arm levers. The four I-shaped arm levers are uniformly distributed on two sides of the drive body 34; and one end of each I-shaped arm lever is connected to the drive body 34 through a pin, and the other end of the I-shaped arm lever is connected to the chuck subassembly 40 through a pin. By the above setting, the force of the entire chuck subassembly 40 during the clamping of the object can be more uniformly dispersed. The strength is higher than that of a single support rod, thus avoiding the chuck subassembly 40 from being broken.

In order to enable the actuator 33 to be reset in the drive process, the drive subassembly 30 further includes a reset spring 37; the reset spring 37 is sleeved on the drive connecting rod 32; one end of the reset spring 37 abuts against the drive body 34, and the other end of the reset spring 37 abuts against the actuator 33; and the reset spring 37 can be compressed by the actuator 33 and support the actuator 33 to be reset.

In order to facilitate the sliding of the actuator 33, a drive slideway 341 is arranged at a position, corresponding to the actuator 33, of the drive body 34, and the drive slideway 341 is used for allowing the actuator 33 to slide.

In order to stably close and open the chuck subassembly 40, the actuator 33 is provided with a first stop part 331 and a second stop part 332; the first stop part 331 is arranged at a position of the actuator 33 close to the drive connecting rod 32; and the second stop part 332 is arranged at a position of the actuator 33 away from the drive connecting rod 32.

When the chuck subassembly 40 is closed, the first stop part 331 abuts against the drive body 34, thus preventing the actuator 33 from further moving towards the drive trigger 31.

When the chuck subassembly 40 is opened, the second stop part 332 abuts against the driven support rods 36, thus preventing the actuator 33 from further moving away from the drive trigger 31.

In order to enable the driving support rods to maintain the stability of the chuck subassembly 40 after the chuck subassembly 40 is closed, a support rod stop part 351 is arranged at a position, corresponding to the chuck subassembly 40, of each driving support rod 35; after the chuck subassembly 40 is closed, the support rod stop parts 351 abut against the chuck subassembly 40, thus preventing the chuck subassembly 40 from being loosened.

Specifically, the connecting rod subassembly 10 includes at least two connecting rods 11; one end of one of the two connecting rods 11 is connected to the handle 20, and one end of the other connecting rod 11 is connected to the drive subassembly 30; the other ends of the two connecting rods 11 are rotatably connected through a connecting subassembly 12, so that the two connecting rods 11 can be spread from and gathered with each other.

The connecting subassembly 12 includes two connecting heads 121; one ends of the two connecting heads 121 are pivoted, and the other ends of the two connecting heads 121 are connected through a fastener 122.

When the fastener 122 is locked, the two connecting rods 11 are spread from each other to achieve locking; and when the fastener 122 is unlocked, the two connecting rods 11 are rotatable for gathering.

In order to maintain the stability of the connecting rod subassembly 10 during gathering, the connecting rod subassembly 10 further includes a fixing fastener 13; the fixing fastener 13 includes two C-shaped fasteners 131, the back parts of which are connected; and after the two connecting rod subassemblies 10 are gathered, each connecting rod 11 extends into the corresponding C-shaped fastener 131 for fastening.

A fastening bulge 1311 is arranged in each C-shaped fastener 131; fastening slots 111 are arranged at positions, corresponding to the fastening bulges, of the corresponding connecting rods 11; and the fastening bulges 1311 can be fastened to the corresponding fastening slots 111, so as to firmly gather and fix the connecting rods 11.

The implementation modes of the present disclosure are described in detail above in conjunction with the accompanying drawings, but the present disclosure is not limited to the described implementation modes. For those skilled in the art, various changes, modifications, alterations, and transformations are made to these implementation modes without departing from the principle and spirit of the present disclosure, and shall still fall within the protection scope of the present disclosure.

What is claimed is:

1. An extensible stable clamping device, comprising: a chuck subassembly capable of being closed and opened, wherein the chuck subassembly comprises: two clamping jaw bodies used for clamping an object, and a clamping jaw head arranged at a top of each clamping jaw body and capable of contacting each other to maintain the stability of the extensible stable clamping device;
   the two clamping jaw bodies are curved towards the inner sides and are symmetrically disposed; after the two clamping jaw bodies are closed, a clamping gap is formed between the clamping jaw bodies; the clamping gap is capable of accommodating a clamped object;
   each clamping jaw head is located at the top of the clamping jaw body and extends a distance in a direction where the clamping jaw body extends out to form a plate shape; and after the two clamping jaw bodies are closed, the two clamping jaw heads are attached to each other to improve the clamping stability of the extensible stable clamping device;
   wherein the extensible stable clamping device further comprises a foldable connecting rod subassembly, a handle mounted at one end of the connecting rod subassembly, and a drive subassembly mounted at the other end of the connecting rod subassembly;
   the chuck subassembly is mounted on the drive subassembly; the drive subassembly is driven to drive the chuck subassembly to be closed and opened, thus completing picking and placement of the object;
   the driving subassembly comprises a drive trigger mounted on the handle, a drive connecting rod which is in drive connection with the drive trigger, an actuator mounted on the drive connecting rod, a drive body used for mounting the actuator, and driving support rods and a driven support rods; one end of each driving support rod and one end of each driven support rod are rotatably mounted on the drive body, and the other end of the driving support rod and the driven support rod are rotatably connected to the chuck subassembly; the driving support rods are further in drive connection with the actuator;
   the drive trigger is triggered towards the handle; the drive trigger drives the drive connecting rod; the drive connecting rod drives the actuator to move towards the handle; the actuator drives the driving support rods to rotate towards the inner side; the driving support rods drives, through the chuck subassembly, the driven support rods to rotate towards the inner side, thus closing the chuck subassembly;
   the drive trigger is triggered away from the handle; the drive trigger drives the drive connecting rod; the drive connecting rod drives the actuator to move away from the handle; the actuator drives the driving support rods to rotate towards the outer side; the driving support rods drive, through the chuck subassembly, the driven support rods to rotate towards the outer side, thus opening the chuck subassembly.

2. The extensible stable clamping device according to claim 1, wherein the drive subassembly further comprises a reset spring; the reset spring is sleeved on the drive connecting rod; one end of the reset spring abuts against the drive body, and the other end of the reset spring abuts against the actuator; and the reset spring is capable of being compressed by the actuator and supporting the actuator to be reset.

3. The extensible stable clamping device according to claim 2, wherein a drive slideway is arranged at a position, corresponding to the actuator, of the drive body, and the drive slideway is used for allowing the actuator to slide.

4. The extensible stable clamping device according to claim 3, wherein the actuator is provided with a first stop part and a second stop part; the first stop part is arranged at a position of the actuator close to the drive connecting rod; the second stop part is arranged at a position of the actuator away from the drive connecting rod;
   when the chuck subassembly is closed, the first stop part abuts against the drive body, thus preventing the actuator from further moving towards the drive trigger;
   when the chuck subassembly is opened, the second stop part abuts against the driven support rods, thus preventing the actuator from further moving away from the drive trigger.

5. The extensible stable clamping device according to claim 4, wherein a support rod stop part is arranged at a position, corresponding to the chuck subassembly, of each driving support rod;
   after the chuck subassembly is closed, the support rod stop parts abut against the chuck subassembly, thus preventing the chuck subassembly from being loosened.

6. The extensible stable clamping device according to claim 1, wherein the connecting rod subassembly comprises at least two connecting rods; one end of one of the two connecting rods is connected to the handle, and one end of the other connecting rod is connected to the drive subassembly; the other ends of the two connecting rods are rotatably connected through a connecting subassembly, so that the two connecting rods are capable of being spread from and gathered with each other;
   the connecting subassembly comprises two connecting heads; one ends of the two connecting heads are pivoted, and the other ends of the two connecting heads are connected through a fastener;

when the fastener is locked, the two connecting rods are spread from each other to achieve locking;

when the fastener is unlocked, the two connecting rods are rotatable for gathering.

7. The extensible stable clamping device according to claim 6, wherein the connecting rod subassembly further comprises a fixing fastener; the fixing fastener comprises two C-shaped fasteners, the back parts of which are connected; after the two connecting rod subassemblies are gathered, each connecting rod extends into the corresponding C-shaped fastener for fastening;

a fastening bulge is arranged in each C-shaped fastener; fastening slots are arranged at positions, corresponding to the fastening bulges, of the corresponding connecting rods; the fastening bulges are capable of being fastened to the corresponding fastening slots, so as to firmly gather and fix the connecting rods.

* * * * *